Jan. 2, 1945. R. S. DEANS 2,366,443
CASTOR TABLE
Filed July 19, 1943 3 Sheets-Sheet 1

INVENTOR
ROBERT S. DEANS,
by John E. Jackson
his Attorney.

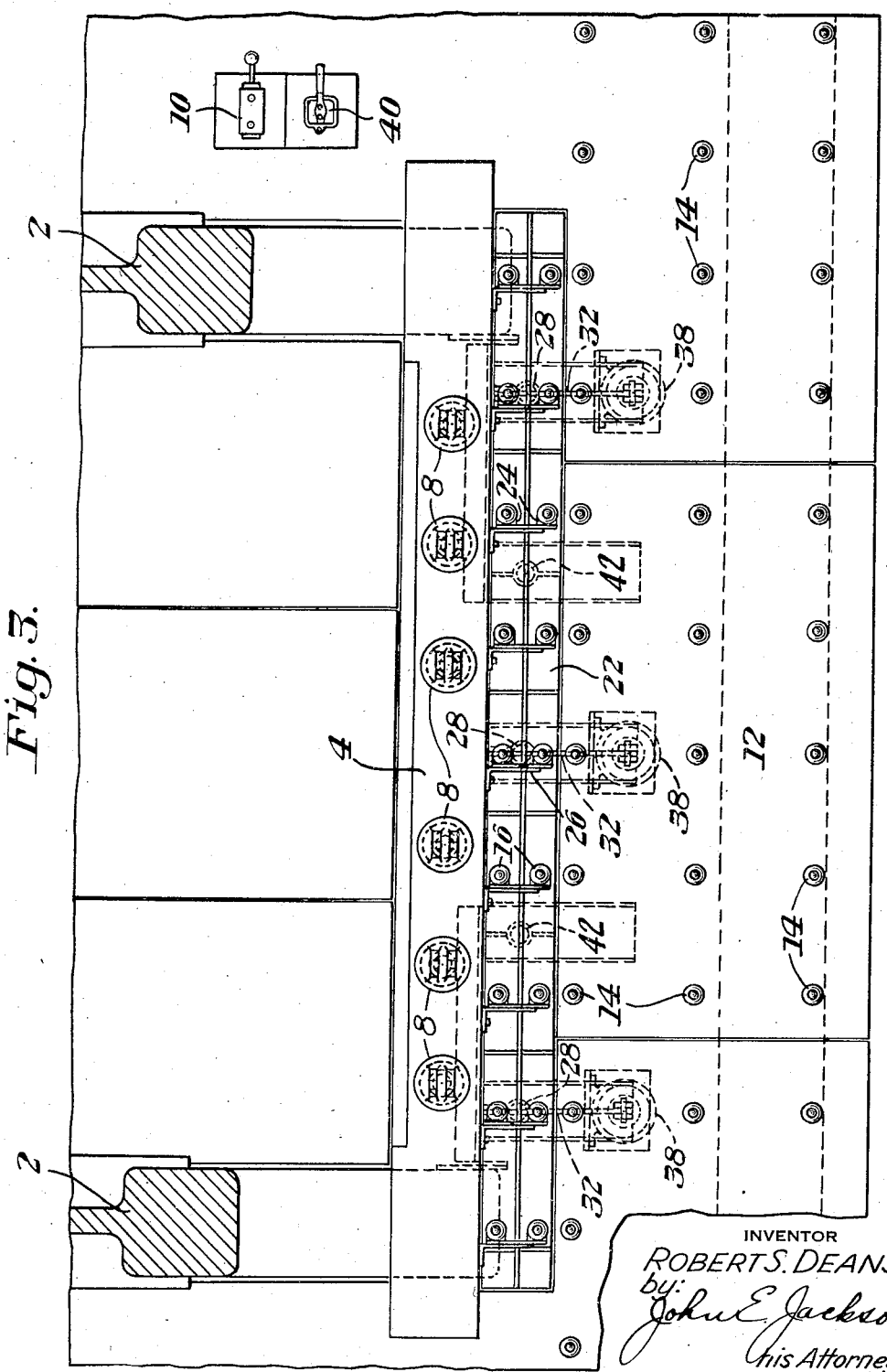

Patented Jan. 2, 1945

2,366,443

UNITED STATES PATENT OFFICE 2,366,443

CASTER TABLE

Robert S. Deans, Pittsburgh, Pa., assignor to Carnegie-Illinois Steel Corporation, a corporation of New Jersey Application July 19, 1943, Serial No. 495,386

3 Claims. (Cl. 164—78)

This invention relates to a caster table and more particularly to a caster table for a plate shear. Large steel plates are frequently cut to size on shears having a caster table on which the plates are moved by hand into shearing position. This type of equipment is used for shearing plates to irregular sizes and for side and end trimming large plates. The plates to be sheared are placed on the caster table by means of a crane and are moved by hand into the various positions under the shear for the different cuts required. The shear is equipped with a shear table on which the plate rests while being sheared, the top of the casters and the shear table being in substantially the same horizontal plane so that the plate, when sheared, is in a plane normal to the edge to be sheared. Since a portion of the plate lies directly on the shear table, it is difficult for the operator to manually move the plate into shearing position.

It is an object of this invention to provide a caster table having a section adjacent the shear table which is vertically movable above the shear table.

This and other objects will be more apparent after referring to the following specification and attached drawings, in which:

Figure 3 is a horizontal section on line III—III of Figure 1.

Figure 1:
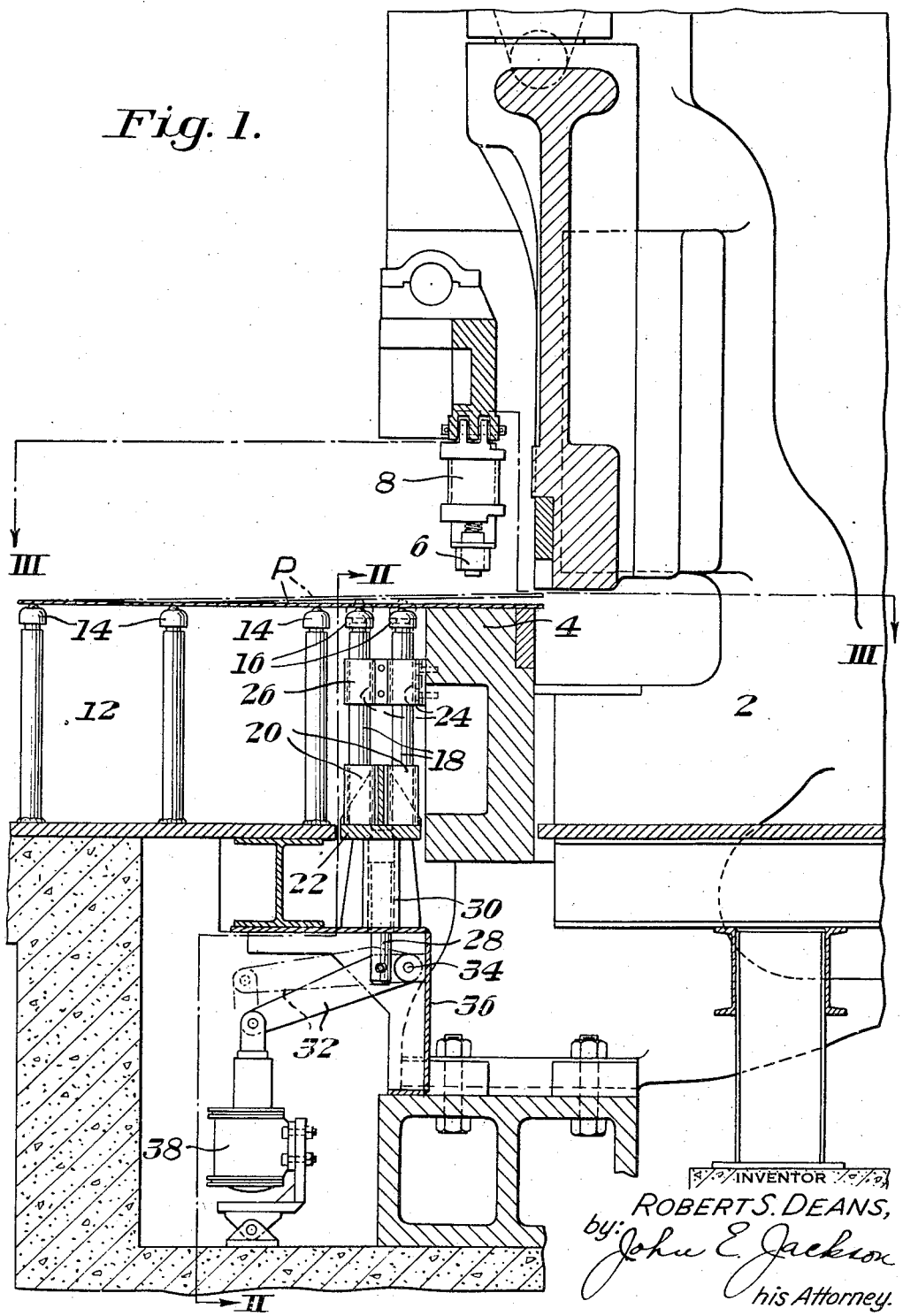
Figure 1 is a sectional view on line I—I of Figure 2.
Figure 2:
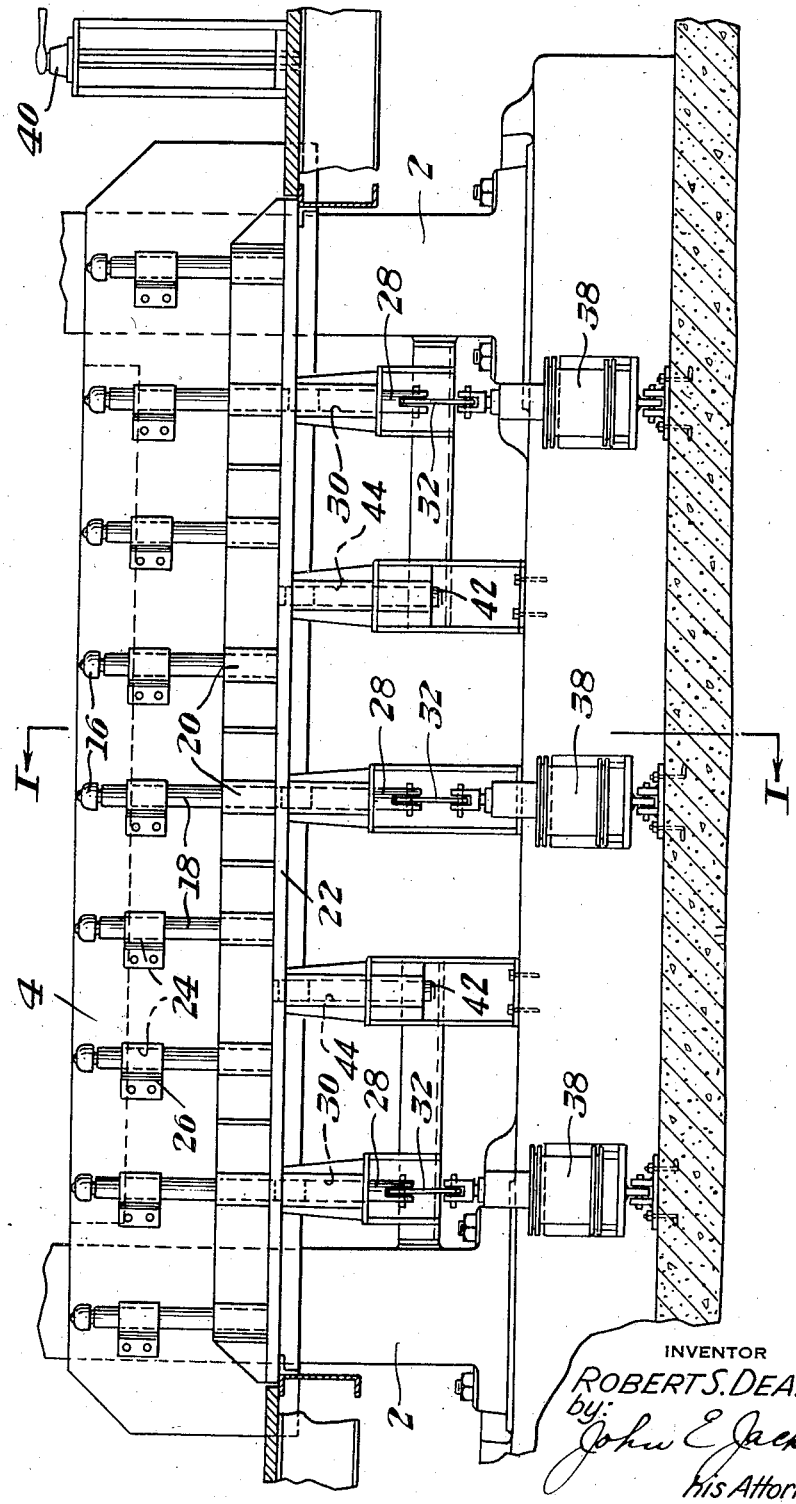
Figure 2 is a vertical sectional view on line II—II of Figure 1.

Referring more particularly to the drawings, the reference numeral 2 indicates a plate shear having a table 4 on which the plate to be sheared rests during shearing. Above this table is a plunger 6 which is actuated by a hydraulic cylinder 8 controlled by a hand operated hydraulic valve 10. In front of the shear is a caster table 12 which consists of a plurality of stationary ball casters 14 and a plurality of movable ball casters 16 between the stationary casters 14 and the table 4. The table 4, the stationary casters 14 and the movable casters 16 are normally in substantially the same horizontal plane. The ball casters 16 which are carried on lengths of extra heavy pipe 18 supported in sockets 20 are attached to a cross bar 22. The pipes 18 are guided through circular openings 24 in brackets 26 which are attached to the shear. A plurality of guide rods 28 are welded to the cross bar 22 and are guided in circular guides 30. To the bottom of each of the rods 28 is attached a lever 32 which is pivotally mounted at 34 on a bracket 36 attached to the shear. The lever 32 is actuated by means of a pivotally mounted air cylinder 38 attached to the free end of the lever, the operation of the air cylinder 38 being controlled by the valve 40. To better guide the casters 16 in their movement, a guide rod 42 is welded to the cross bar 22 between each pair of rods 28, the rods 42 being guided in circular guides 44.

The operation of the device is as follows:

The casters 14 and 16 are normally in the position shown in full lines in Figure 1 with the plate P resting on the casters and the table 4. When it is desired to manipulate the plate P to position it for shearing, the air valve 40 is opened to admit air to the bottom of cylinder 38. This moves the lever 32 and casters 16 to the dotted line position shown in Figure 1, thus raising the plate P from the shear table 4 and enabling the operator to more easily shift the plate to the desired position under the shear. The valve 40 is then shifted to admit air to the top of cylinder 38, thus returning the casters 16 to the full line position shown in Figure 1. The hydraulic valve 10 is operated to admit hydraulic fluid to the top of hold-down cylinders 8 causing the plungers 6 to press firmly down on the surface of the plate P to hold it in position during shearing. After the shearing operation is completed, the valve 10 is operated to admit fluid to the bottom of hold-down cylinders 8, thus raising the plungers 6 from the plate. The operation described above is repeated until the plate P is sheared as desired.

While one embodiment of the invention has been shown and described, it will be apparent to one skilled in the art, that other modifications and adaptations may be made without departing from the scope of the following claims.

I claim:

1. A caster table for a plate shear having a table for supporting a plate during shearing comprising a plurality of stationary casters, a plurality of movable casters adjacent the shear table, the tops of said casters and table normally being in substantially the same horizontal plane, and means for raising said movable casters above said horizontal plane to facilitate handling of said plate.

2. A caster table for a plate shear having a table for supporting a plate during shearing comprising a plurality of stationary casters, a plurality of movable casters adjacent the shear table, the tops of said casters and table normally being in substantially the same horizontal plane, a lever connected to said movable casters and means for actuating said lever to raise said movable casters above said horizontal plane to facilitate handling of said plate.

3. A caster table for a plate shear having a table for supporting a plate during shearing comprising a plurality of stationary casters, a plurality of movable casters adjacent the shear table, the tops of said casters and table normally being in substantially the same horizontal plane, a support for said movable casters, a lever connected to said support and means for actuating said lever to raise said movable casters above said horizontal plane to facilitate handling of said plate.

ROBERT S. DEANS.